June 30, 1953  A. ACKLEY  2,643,561
WIRE STRIPPING IMPLEMENT
Filed May 14, 1949  2 Sheets-Sheet 1
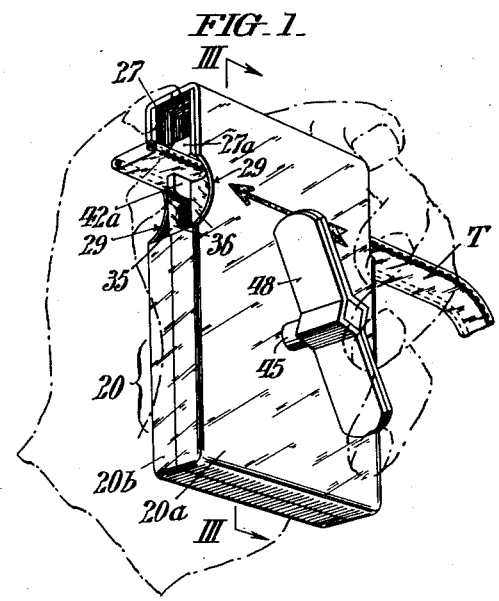
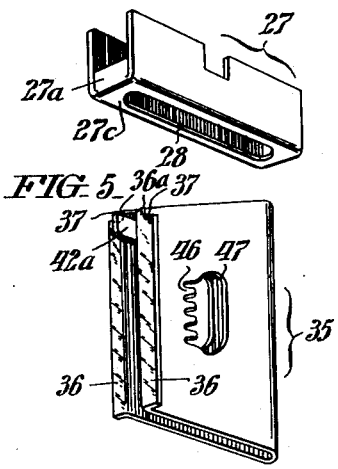
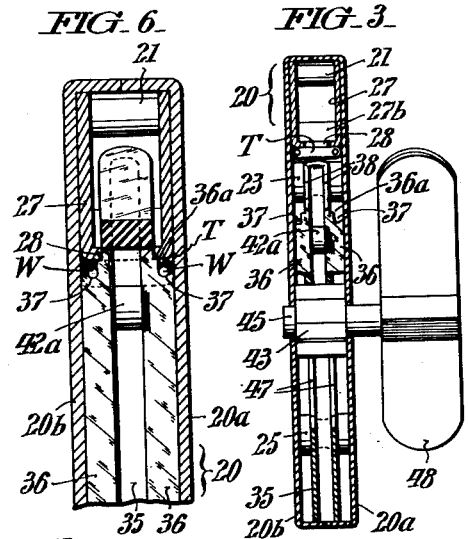
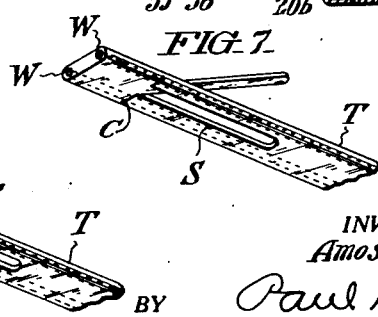
WITNESSES
INVENTOR:
Amos Ackley,
BY
ATTORNEYS.

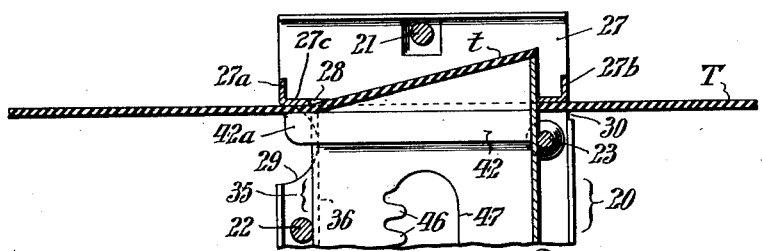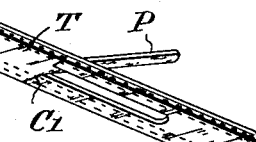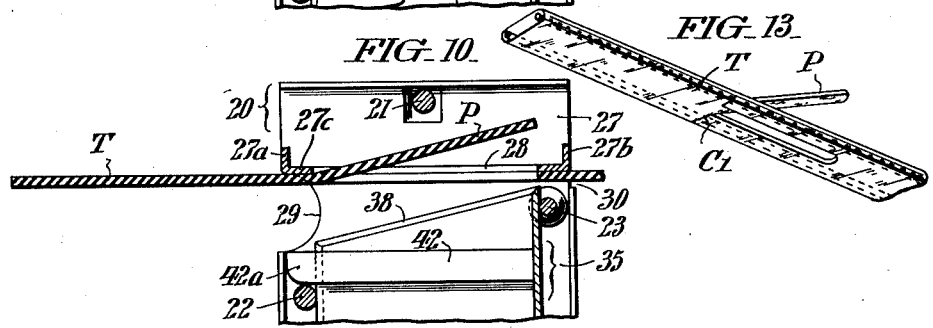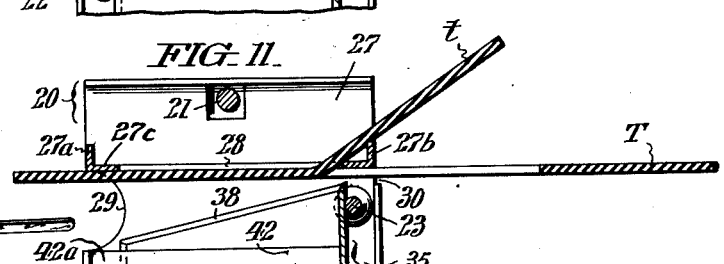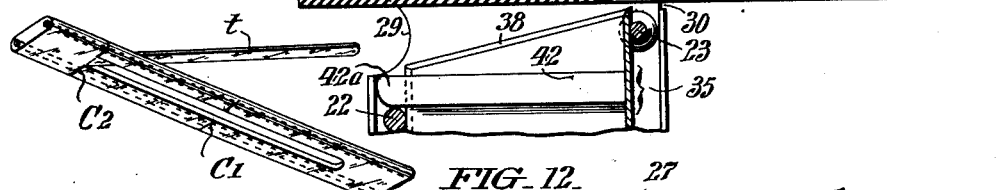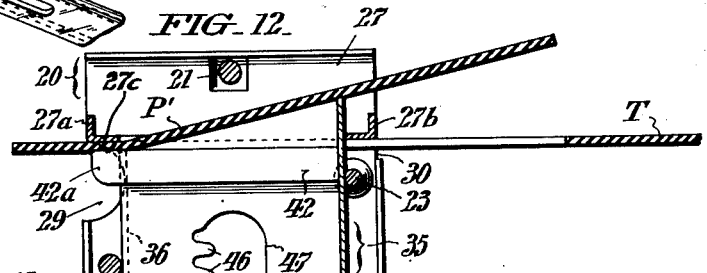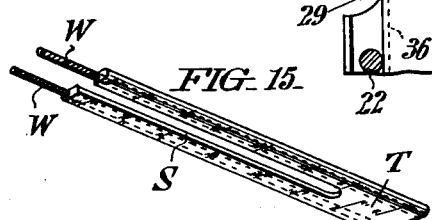

Patented June 30, 1953

2,643,561

UNITED STATES PATENT OFFICE 2,643,561

WIRE STRIPPING IMPLEMENT

Amos Ackley, Camden, N. J.

Application May 14, 1949, Serial No. 93,323

5 Claims. (Cl. 81—9.5)

This invention relates to implements or devices useful to electricians in stripping insulation from wires to bare the ends of the latter in preparation for connection to the binding posts or screws of various electrical instruments or appliances.

The chief aim of my invention is to provide a device of the character referred to which is compact and simple in construction; which lends itself to ready fabrication at small cost; and which is more especially adapted for longitudinally end slitting of the insulation of twin wire conductors of the tape type such as is commonly employed, for example, in the installation of television antennae and the like, and capable at the same time of cutting and stripping the insulation from the wires adjacent the ends of the segments set apart by the slitting.

Other objects and attendant advantages will appear from the following detailed description of the attached drawings, wherein Fig. 1 is a perspective view of twin wire tape slitting and stripping device conveniently embodying my invention.

Fig. 2 is a longitudinal sectional view of the device.

Fig. 3 shows a transverse section taken as indicated by the angled arrows III—III in Figs. 1 and 2.

Figs. 4 and 5 are perspective views of certain constituent parts of the device which will be particularly described hereinafter.

Fig. 6 is a fragmentary view in section corresponding to Fig. 3, drawn to a larger scale, with the parts differently positioned to show how the insulation is partially cut immediately around the wires of the tape.

Fig. 7 is a fragmentary perspective view showing the complete cut made in the insulation of the tape by the device.

Fig. 8 is a view like Fig. 7 showing the severed waste portion of the insulation removed from the tape; and Figs. 9–12 are fragmentary views in section corresponding to Fig. 2 showing successive steps followed in the operation of the device to form longer slits than in Fig. 8.

Figs. 13, 14 and 15 show the effects produced upon the tape by the successive steps illustrated in Figs. 9–12.

From Figs. 1–3 of these illustrations it will be seen that the splitting and stripping implement of my invention is characterized by having a flat rectangular casing 20. Although it may be otherwise constructed, if desired or found more convenient, the casing 20 is in this instance formed by two counterpart half sections 20a and 20b which are fashioned from stiff sheet material, preferably non-corrosive metal. As shown, the two sections, 20a and 20b meet in the central longitudinal plane of the casing, and are held together by rivets 21, 22, 23, 24 and 25 spot welded in place at opposite ends.

Fitted into the casing 20 at the top and secured therein, likewise preferably by spot welding, is a female cutting element 27 which, in practice, is fashioned from hardened sheet steel to channel cross sectional configuration, and which is provided in its bottom or horizontal web with a central longitudinal slot 28 as best seen in Fig. 4, terminal extensions of said web being bent upwardly as at 27a, 27b. The narrow end walls of the casing 20 terminate short of the bottom of the element 27 (Figs. 1 and 2) with resultant provision of apertures 29 and 30 through which the tape T is adapted to be passed. From Figs. 1 and 3, it is to be especially noted that the internal transverse dimension of the casing 20 is equal in width to the tape T. Accordingly as the tape is introduced from the right in Figs. 1 and 2, the side walls of the casing serve as guides between which the tape is confined and held centered longitudinally relative to the slot 28 in the female cutting element 27.

Constrained to up and down movement in the lower part of the casing 20 between the crosswise extending rivets 22, 23 and 24, 25, is a male cutting element 35 which, like the female cutting element 27, is fashioned from hardened steel. As best shown in Fig. 5, the element 35 is U shaped in horizontal section and has lateral face flanges 36 extending outwardly from its opposite sides at the front or open end, said flanges 36 being provided at the top with arcuate cutting notches 37 for a purpose presently explained. The element 35 is sloped upwardly somewhat from the front toward the rear at the top, and the top edge thereof is beveled as at 38 in Fig. 2 to shear against the edge of the slot 28 of the female element 17 in cutting a central slit S (Figs. 7 and 8) into insulation of the tape T when elevated as indicated in dash and dot lines in Fig. 2. The upward limit of movement of the element 35 is determined by engagement of shoulders 36a on its flanges 36 with the bottom face of the element 27 beyond the corresponding end of the slot 28 as shown in Fig. 6. Lateral displacement of the element 35 is prevented through engagement of its rear edge with circumferential grooves of the rivets 23 and 25 which are spool shaped (see Fig. 3), by engagement of the vertical edges of its flanges 36 with the casing sides. A filler piece 42 secured by welding in the interval between the sides of the element 35 adjacent the top is extended at the front as at 42a for a purpose likewise explained hereinafter.

The means provided for actuating the male cutting element 35 includes a spur pinion 43 which may be integral with, or suitably secured to, a shaft 45 extending through transversely-aligned bearing apertures in the side walls of the casing 20, and which meshes with rack teeth 46 formed at corresponding edges of vertically alongate clearance openings 47 in the opposite sides of said element. As shown in Figs. 1 and 3, the shaft 45 protrudes beyond one side of the casing 20, and affixed to the protruding end thereof is a manipulating element in the form of a double wing 48.

*Operation*

In the use of the device, the tape T is inserted through the aperture 29 in the rear end wall of casing 20 beneath the female cutting element 27 and passed out through the aperture 30, in the front end wall of said casing in the direction of the arrow in Fig. 1 and as shown in Fig. 2 with a portion of its end extending beyond the latter opening. With this preparation, the shaft 45 is turned clockwise in Fig. 1 and the male cutting element 35, as a consequence, elevated by action of the pinion 43 upon the teeth 46, its movement being stopped by engagement of the shoulders 36a at the tops of its frontal flanges 36 with the bottom of the female cutting element 27 as in Fig. 6. As the male element 35 is raised and its beveled top edge passes through the correspondingly configured slot 28 of the female element 27, the tape T is slitted as at S and the insulation concurrently cut part way around the conductors W as at C in Fig. 7 by the curved cutting notches 37 in the flanges 36 of said element 35. With the male cutting element 35 fully raised to the dot-and-dash line position in Fig. 2, the partly detached portion P of the tape T is displaced upwardly as at *t*, and the projecting tape held between the clamping surface 27c at the bottom of the front end of the element 27 and the projecting end 42a of the filler piece 42 and thereby prevented from bending or curling downwardly. When the tape T is finally withdrawn rightward in Fig. 1 from within the casing 20 through the aperture 30, the part P is retained by the clamping action of the shoulders 32a of element 35 and stripped from the ends of the wires W beyond the cuts C as in Fig. 8. Then, after retraction of the male cutting element 35 by reverse turning of the shaft 45, the detached waste part P of the tape insulation is pulled from the casing 20 through the rear aperture at 29.

When a slit of twice the previous length is desired, the tape T is passed through the casing 20 as before, but its end extended beyond the aperture 30 by a correspondingly greater distance. A first cut is made as shown in Fig. 9 by actuation of the male cutting element 35 which is thereupon immediately retracted as in Fig. 10, and the tape T drawn rightward until stopped by encounter of the tongue *t* with the front end of the slit 28 in the female cutting element 27 as in Fig. 11. The male cutting element 35 is then again advanced as in Fig. 12 to make a second cut C². With the cutting element 35 so held and the partially separated portion P' clamped to the cutting element 27 by the shoulders 36a of the element 35, the tape T is finally withdrawn rightward from the casing 20 with incidental stripping of said portion from the wires as in the first described instance. By repeating the above procedure, it will be apparent that any desired length of slit may be made in the tape with final baring of the wire at the ends of the segments set apart by the slitting.

Having thus described my invention, I claim:

1. An implement for stripping insulation from twin wire electric conductor tape, comprising a female cutting element with an elongate slot therein of a width less than the spacing of the conductors of the tape, and with a clamping surface beyond one end of the slot; means for guiding the tape endwise into position onto said cutting element centrally over the slot therein; a male cutting element with a U-shaped cutting edge adapted to enter the slot of the female cutting element and slit the insulation of the tape longitudinally between conductors; and with lateral clamp portions at the leg ends of the U-shaped cutting edge to cooperate with the clamping surface of the female element, said clamp portions having arcuate cutting notches to sever the insulation part way around the respective conductors of the tape; and means for moving the male cutting element relative to the female cutting element to effect the cutting.

2. An implement for stripping insulation from twin wire electric conductor tape, comprising a flat casing with ingress and egress openings in its opposite end walls for introduction of the tape; a female cutting element fixed in the upper part of the casing, said element having an elongate medial slot therein of a width less than the spacing of the conductors of the tape and being at the level of the ingress and egress openings of the casing, and a clamping surface at the bottom of its front end; a male cutting element guided for up and down movement in the lower part of the casing, said male element having a U-shaped cutting edge adapted to enter the slot of the female cutting element to slit the tape longitudinally between conductors, and lateral clamp portions at the leg ends of the U-shaped cutting edge to cooperate with the clamping surface of the female element, said clamp portions having arcuate cutting notches to sever the insulation part way around the respective conductors of the tape; and actuating means operable from the exterior of the casing for moving the male cutting element relative to the female cutting element to effect the cutting.

3. An insulation stripping implement according to claim 2, wherein the actuating means includes a transverse shaft with rotative support in the side walls of the casing, a toothed pinion on the shaft within the casing, rack teeth on the male cutting element in mesh with the pinion, and a manipulating member on a protruding end of the shaft.

4. An implement for cutting insulation of flat twin wire electric conductor tape, comprising a female cutting element with an elongate slot therein; an opposing male element with a U-shaped cutting edge adapted to enter the slot of the female cutting element to cooperate with the side edges and one end edge of the slot in cutting a correspondingly shaped slit lengthwise through the insulation of the tape in the interval between the conductors inward of the end of the tape; and other knife edges laterally of the leg ends of the male cutting element for severing the insulation of the tape crosswise of the respective conductors at the ends of the slit.

5. An implement for cutting and stripping insulation from the end of flat twin wire electric conductor tape, comprising a female cutting element with an elongate slot therein; an opposing male cutting element with a U-shaped cutting edge adapted to enter the slot of the female cutting element to cooperate with the side edges and one edge of the slot in cutting a correspondingly shaped slit lengthwise through the insulation of the tape in the interval between the conductors inward of the end of the tape; clamp portions laterally of the leg ends of the U-shaped knife edge of the male component having arcuate cutting edges for severing the insulation crosswise of the respective conductors at the end of the slit; and a cooperative surface on the female element between which and the clamp portions of the male element, the insulation at the end of the tape severed by the cutting is held and stripped from the conductors as the tape is subsequently withdrawn rearwardly from the implement.

AMOS ACKLEY.

References Cited in the file of this patent

UNITED STATES PATENTS

| Number | Name | Date |
|---|---|---|
| 1,675,838 | Bernard | July 3, 1928 |
| 1,866,095 | Foley | July 5, 1932 |
| 2,054,973 | Ferguson | Sept. 22, 1936 |
| 2,313,793 | Wood | Mar. 16, 1943 |
| 2,521,688 | Cataldo | Sept. 12, 1950 |